United States Patent
Harrison

[15] 3,657,889
[45] Apr. 25, 1972

[54] HYDRAULIC STEERING SYSTEM FOR BOATS

[72] Inventor: Robert R. Harrison, Elyria, Ohio
[73] Assignee: Nemo Corporation, Cleveland, Ohio
[22] Filed: Aug. 11, 1970
[21] Appl. No.: 62,790

Related U.S. Application Data

[63] Continuation-in-part of Ser. No. 820,222, Apr. 29, 1969, Pat. No. 3,566,746.

[52] U.S. Cl. .................... 60/54.5 R, 60/54.6 M, 60/52 S, 91/6.5
[51] Int. Cl. ..................................................... F15b 7/00
[58] Field of Search ................... 60/54.5 R, 54.6 M, 52 S; 91/6.5

[56] References Cited

UNITED STATES PATENTS

| | | | |
|---|---|---|---|
| 2,426,695 | 9/1947 | Kremiller | 60/54.5 R |
| 2,608,060 | 8/1952 | Smith | 60/54.5 R |
| 2,185,277 | 1/1940 | Stelzer | 60/54.5 R |
| 2,397,270 | 3/1946 | Kelly | 60/54.5 R |
| 2,855,755 | 10/1958 | Auger | 60/54.5 R |
| 3,271,954 | 9/1966 | Marsee et al. | 60/54.5 R |

Primary Examiner—Edgar W. Geoghegan
Attorney—Oberlin, Maky, Donnelly & Renner

[57] ABSTRACT

Steering system includes a pump mechanism wholly contained within the master unit which is the steering wheel shaft mount in front of the dash panel, and has a porting plate protruding behind the dash panel to a slight extent sufficient to provide room for connection of fittings thereto and attachment of the master unit to the dash panel. The slave unit for the steering system is mounted in the stern of the boat and may contain the valving for controlling fluid flow between the pump mechanism and slave unit, thereby reducing the mounting space required if the valving were contained in the master unit. Locating the valving in the slave unit also provides the safety feature that if there is a loss of fluid pressure in the system due to line breakage between the master and slave units, the slave unit will be locked against movement preventing complete loss of control and wild gyrations of the boat.

9 Claims, 8 Drawing Figures

PATENTED APR 25 1972

INVENTOR

ROBERT R. HARRISON

BY Oberlin, Maky, Donnelly & Renner
ATTORNEYS

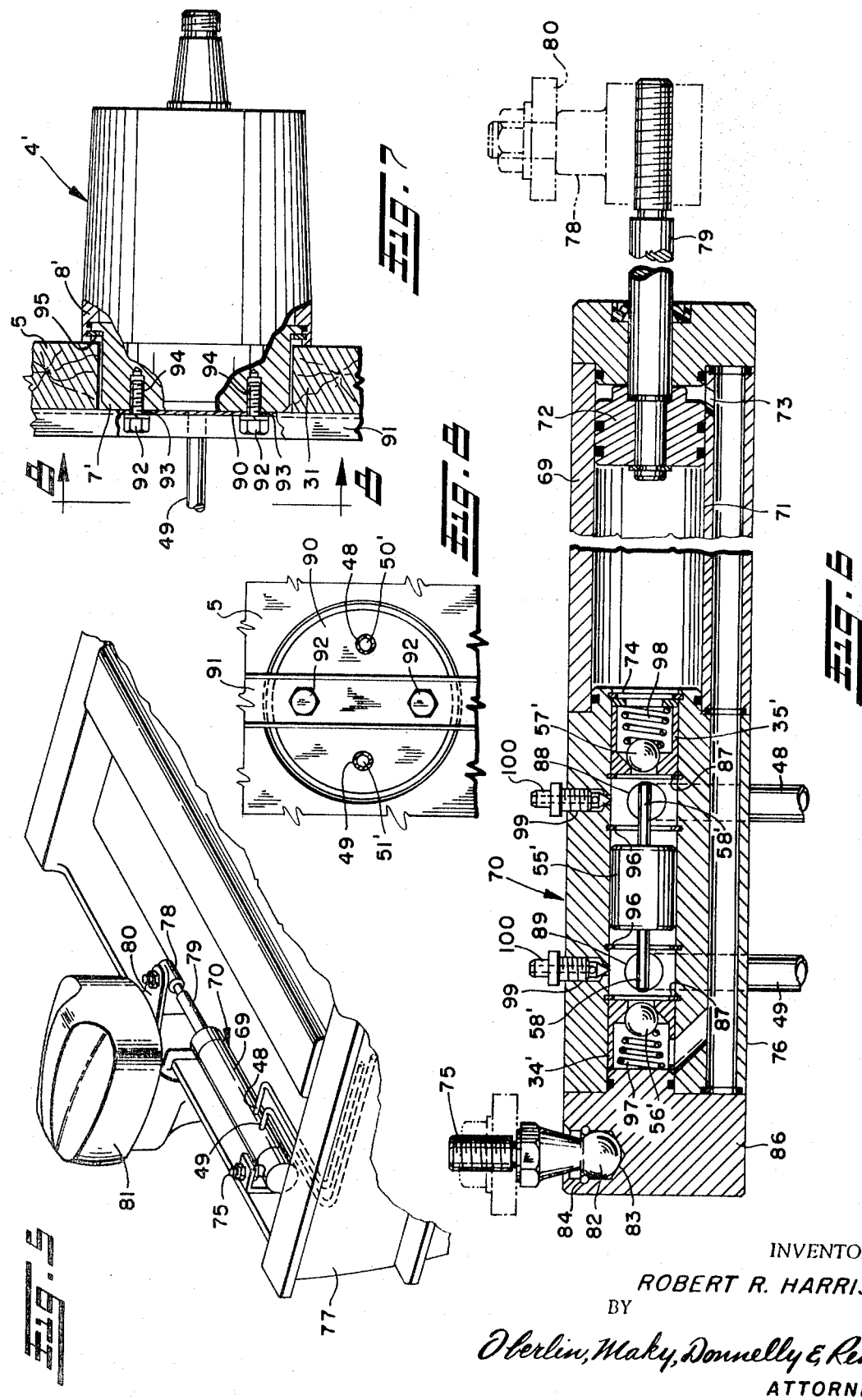

3,657,889

HYDRAULIC STEERING SYSTEM FOR BOATS

CROSS-REFERENCE TO RELATED APPLICATIONS

This application is a continuation-in-part of my copending U.S. application Ser. No. 820,222, filed Apr. 29, 1969, now U.S. Pat. No. 3,566,746, granted Mar. 2, 1971.

BACKGROUND OF THE INVENTION

The present invention relates generally as indicated to a steering system, particularly for use in controlling the movements of an outboard motor or rudder of a boat, which is more compact and requires less mounting space than previous known steering systems.

The master unit of existing steering control systems, whether of the wire, cable, or hydraulic actuated type, generally includes substantial drive or pump mechanisms which ordinarily occupy a considerable amount of space behind a dash panel or other mounting support for connection to a steering column projecting through the mounting support from the front. Oftentimes, however, adequate space is not available behind the dash panel for the drive or pump mechanism, and if modifications are made to provide the room necessary for the drive mechanism, it may be to the sacrifice of much needed seating space within the boat. Moreover, such mechanisms, because of their size, are often difficult to install and remove and are not readily serviceable when necessary without removing the same from behind the dash panel or mounting support.

The valving for controlling fluid flow between the pump mechanism and slave unit at the stern of the boat is also usually contained within the master unit. This of course increases the space requirements for the master unit, and there is also the danger of complete loss of control and violent reactions of the boat in the event of loss of fluid between the master and slave units due to line breakage.

SUMMARY OF THE INVENTION

It is accordingly a principal object of this invention to provide a steering system which is more compact and requires less mounting space behind a mounting support than previous known steering systems.

Still another object is to provide such a steering system which may be readily installed and removed and may also be serviced in place.

Yet another object is to provide a steering system with the safety feature that it will maintain the existing position of the boat whenever there is a loss of fluid pressure in the fluid lines between the master and slave units.

These and other objects of the present invention may be achieved by locating the pump mechanism within the master unit of the steering system which provides the steering wheel shaft mount in front of the mounting support so that only a portion of the porting plate need protrude behind the mounting support for the steering system, sufficient to provide connection of fittings to the porting plate of the steering system. The valving for controlling fluid flow between the pump mechanism and slave unit may also be located in the porting plate behind the mounting support if desired, but it is preferred that the valving be contained within the slave unit at the stern of the boat not only to reduce the space required behind the dashboard for the porting plate, but also to provide the important safety feature of effectively preventing any violent reactions or wild gyrations of the boat in the event of loss of fluid pressure due to line breakage.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but several of the various ways in which the principles of the invention may be employed.

BRIEF DESCRIPTION OF THE DRAWINGS

In the annexed drawings:

FIG. 5 is a fragmentary perspective view showing the slave unit of the steering system mounted in the stern of the boat;

FIG. 6 is an enlarged partial longitudinal section through the slave unit of FIG. 5;

FIG. 7 is a side elevation view, partly in section, of a modified form of slave unit and mount therefor for use with the slave unit of FIGS. 5 and 6; and FIG. 8 is an end elevation view of the master unit and mount therefor of FIG. 7 as seen from the plane of the line 8—8.

DESCRIPTION OF THE PREFERRED EMBODIMENTS

Figure 1:
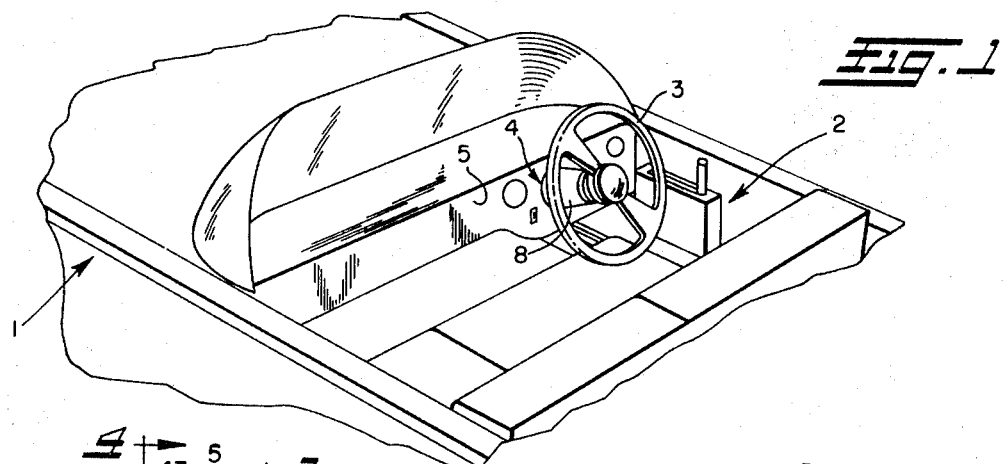
FIG. 1 is a fragmentary perspective view of a portion of a motor boat having mounted on the dashboard thereof the master unit of a preferred form of steering system constructed in accordance with this invention.

In FIG. 1 there is illustrated a power boat 1 of typical construction including a seating compartment 2 having a steering wheel 3 operatively connected to the master helm unit 4 of a steering system in accordance with this invention mounted on a dash panel or other suitable mounting support 5 facing the seating compartment 2. Turning of the steering wheel 3 in opposite directions causes the master unit 4 to supply hydraulic fluid under pressure in a manner to be more fully described hereafter to one or the other of a pair of fluid pressure lines 48 and 49 leading to a slave unit at the stern of the boat. The slave unit may be of the type shown, for example, at 6 in my U.S. Pat. No. 3,475,911, granted Nov. 4, 1969, or may be of the type shown at 70 in FIGS. 5 and 6 hereof and is suitably connected to a tiller handle of a motor or other steering device for controlling the movements thereof in a manner to be more fully described hereafter.

As clearly shown in FIG. 2, the master unit 4 consists of a pump mechanism 6 of suitable type and a porting plate 7 through which hydraulic fluid is pumped from and returned to the pump mechanism 6 as explained below. The hydraulic pump mechanism 6 is wholly contained within a cylindrical housing 8 which may be a die-casting or stamping projecting outwardly from the front side 9 of the mounting support 5 to provide a mount for the steering wheel or drive shaft 10 and shaft extension 11 enclosed by the cylindrical housing 8. Although the hydraulic pump mechanism 6 may be of any suitable design, the preferred form shown herein is of the rotary plunger type, consisting of a cylinder body 12 keyed to the shaft extension 11 for rotation therewith and having a plurality of circumferentially spaced axially extending cylinder bores 13 containing pistons 14 which are urged axially outwardly by springs 15 against the inclined face 16 of a cam or swash plate 17 bolted to the end wall 18 of the cylindrical housing 8. Ball bearings 19 may be contained in recesses 20 in the outer ends of the pistons to provide rolling engagement with the swash plate 17.

The inner end of the cylinder body 12 is maintained in sliding sealed engagement with the end face 21 of the porting plate 7 by a plurality of elongated tie rods 22 which extend from the outer end wall 18 of the cylindrical housing 8 into tapped openings 23 in the porting plate and when tightened draw the porting plate toward the cylinder body. A counterbore 24 in the inner end of the cylindrical housing 8 receives a radial flange 25 on the porting plate 7 for accurately locating the porting plate 7 therein and limiting the extent of inward movement of the porting plate 7 into the cylindrical housing 8 by engagement of the flange 25 with the end wall 26 of the counterbore 24. A central recess 28 in the end face 21 of the porting plate 7 closely slidably receives the inner end of the shaft extension 11 to provide a bearing support therefor, and the shaft extension is also journalled in a roller bearing 29 contained in an opening 30 in the housing end wall 18 through which the shaft extension projects.

Figure 2:
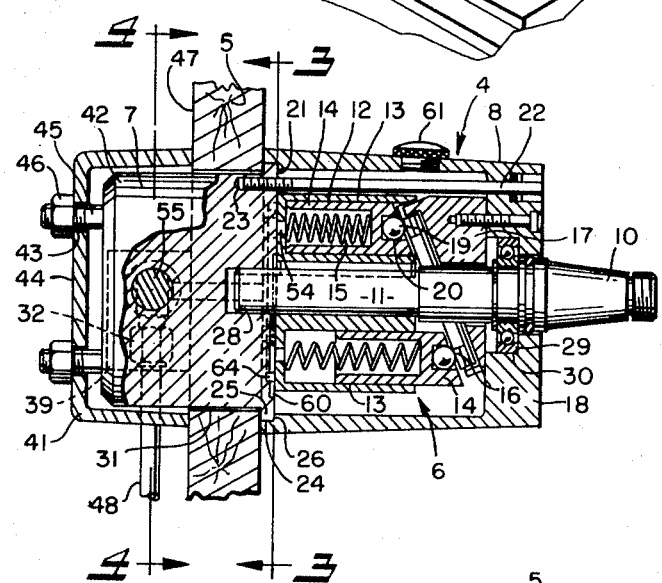
FIG. 2 is a fragmentary longitudinal section through the master unit and dashboard of FIG. 1.
Figure 3:
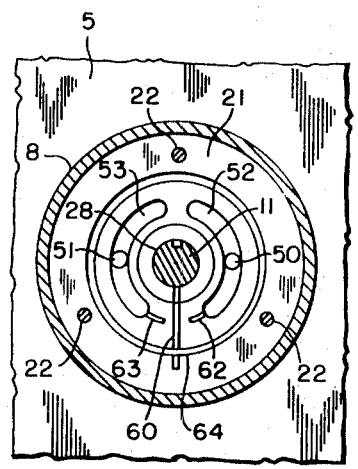
FIG. 3 is a transverse section through the master unit of FIG. 2, taken along the front face of the porting plate on the plane of the line 3—3.
Figure 4:
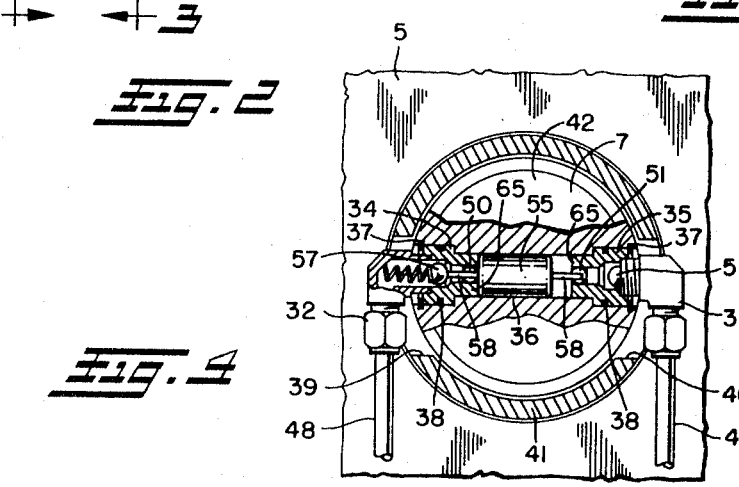
FIG. 4 is a fragmentary transverse section through the porting plate and fittings of FIG. 2, taken on the plane of the line 4—4 thereof.

Referring further to FIG. 2 and also to FIGS. 3 and 4, the porting plate 7 is adapted to be received in an opening 31 in the mounting support 5 and protrudes behind the mounting support to a slight extent, sufficient to provide room for connection of fittings 32 and 33 for the fluid pressure lines 48 and 49 leading to the slave unit 70. The inner ends of the fittings 32 and 33 may have tapered threads thereon providing tight threaded engagement in check valve bodies 34 and 35 releasably retained in opposite ends of a transverse bore 36 in the porting plate 7 by snap rings 37 or the like as clearly shown in FIG. 4. Suitable seals 38 may be provided between the walls of the check valve bodies 34 and 35 and transverse bore 36 to prevent fluid leakage therepast.

The extent of protrusion of the porting plate 7 behind the mounting support 5 may be kept to a minimum by using right angle fittings 32 and 33 which extend through slots 39 and 40 in the sides of a cup-shaped element 41 surrounding the protruding portion 42. The size of the slots 39 and 40 should be sufficient to permit rotational adjustment of the fittings 32 and 33 therein as desired. Openings 43 are provided in the end wall 44 of the cup-shaped element 41 through which studs 45 project from the porting plate 7 for securing the steering system 4 to the mounting support by tightening of nuts 46 on the outer ends of the studs 45 which draws the steering system 4 toward the cup-shaped element and forces the lip of the cup-shaped element into engagement with the back side 47 of the mounting support. However, the cup-shaped element need not be removed for servicing of the pump mechanism 6 when required since removal of the tie rods 22 from the front will permit complete removal of the pump mechanism with the housing 8.

Spaced apart passages 50 and 51 in the porting plate 7 communicate with the transverse bore 36 adjacent the inner ends of the check valve bodies 34 and 35 as shown in FIG. 4 and also with arcuate grooves 52 and 53 in the end face 21 of the porting plate 7 as shown in FIG. 3. During rotation of the cylinder body 12 by the steering wheel 3, the arcuate grooves 52 and 53 will alternately communicate with the cylinder bores 13 through passages 54 in the inner end of the cylinder body 12 (see FIG. 2) for circulation of hydraulic fluid through the system as explained hereafter. The passages 50 and 51, although communicating with the same transverse bore 36 as aforesaid, are isolated from each other by a shuttle valve operating piston 55 having sliding sealed engagement in the transverse bore 36 between the passages 50 and 51 as shown in FIG. 4.

During rotation of the cylinder body 12 in one direction by turning of the steering wheel 3, as for example in a clockwise direction as viewed from the right end of FIG. 2, hydraulic fluid within the cylinder bores 13 is pumped into the groove 53 during axial inward movement of the pistons 14 by engagement with the swash plate 17 for flow through the passage 51 into the transverse bore 36 adjacent the inner end of the check valve body 35 where it acts on a check valve 56 therein to overcome the bias of a spring and unseat the check valve 56 for flow of high fluid pressure to one end of a slave unit 70. This same fluid pressure admitted to the right end of the transverse bore 36 as viewed in FIG. 4 urges the shuttle valve operating piston 55 to the left to unseat the other spring-biased check valve 57 contained in the check valve body 34 at the other end of the bore 36 by engagement by one of the stem portions 58 projecting from opposite ends of the shuttle valve operating piston 55 for return flow of hydraulic fluid from the slave unit through the passage 50 to the groove 52 from which the fluid is drawn into the cylinder bores 13 as the pistons 14 are moved outwardly by their associated springs 15.

Any loss of fluid from the master unit 4 is made up during rotational movement of the cylinder bores 13 past a radial groove 60 in the end face 21 of the porting plate 7 between the arcuate grooves 52 and 53 on the suction side of the pump. As clearly shown in FIG. 2, the radial groove 60 extends radially outwardly beyond the cylinder body 12 to provide communication with the interior of the cylindrical housing 8 which is used as a reservoir for make-up fluid. A cap 61 may be provided in the top of the housing 8 which is removed for filling the reservoir with hydraulic fluid. Narrow extensions 62 and 63 of the annular grooves 52 and 53 may be provided in the end face 21 of the porting plate 7 adjacent the region where the pistons 14 are fully extended as shown in FIG. 3 to prevent cavitation, and an annular groove 64 may also be provided in the end face 21 completely surrounding the arcuate grooves 52 and 53. The annular groove 64 intersects the radial groove 60 for filling by low pressure fluid which provides additional make-up fluid to the low pressure groove 52 or 53 by passage between the mating faces of the porting plate 7 and cylinder body 12 and also retards leakage from the high pressure groove 52 or 53 between such mating faces.

Rotation of the cylinder body 12 by the steering wheel 3 in the reverse or counterclockwise direction causes a reversal in the flow of fluid through the arcuate grooves 52 and 53 and fluid pressure lines 48 and 49 by supplying high fluid pressure to the arcuate groove 52 which opens the check valve 57 for flow of high fluid pressure into the pressure line 48 and forces the shuttle valve operating piston 55 to the right as shown in FIG. 4 to unseat the other check valve 56 by engagement by the stem portion 58 on the other end of the shuttle valve operating piston for return flow from the slave unit 70 through the fluid pressure line 49 to the pump 6. Projections 65 on the check valve bodies 34 and 35 act as stops limiting the movement of the shuttle valve operating piston 55 toward the check valves 56 and 57 to avoid blocking communication between the check valves and passages 50 and 51 by the shuttle valve operating piston when the check valves are opened thereby.

The slave unit 70 is shown in detail in FIGS. 5 and 6 and comprises a cylinder 69 including a chamber 71 containing a piston 72 axially movable therewithin upon venting and pressurizing opposite ends of the chamber through the associated ports 73 and 74. A mounting shaft 75 may be secured to the head end 76 of the cylinder to facilitate attachment of the slave unit 70 to the stern 77 of the boat, and a suitable coupling 78 may be provided on the projecting end of the piston rod 79 for connection to the tiller handle 80 of the motor 81 or rudder of the boat (not shown). The inner end of the mounting shaft 75 may be provided with a ball joint 82 for receipt in a socket 83 in the head end 76 of the cylinder and retained in place by a snap ring 84 to permit pivotal movement of the slave unit 70 during actuation of the tiller handle 80 by the slave piston 72.

In FIGS. 2 through 4, the valving which controls fluid flow between the master unit 4 and slave unit 70 is shown contained within a transverse bore 36 in the porting plate 7 for the master unit, as previously described, in which event the fluid lines 48 and 49 running from the master unit 4 to the slave unit 70 would be directly suitably connected to the ports 73 and 74 of the slave cylinder 69. However, locating the valving within the porting plate 7 requires that the porting plate 7 protrude sufficiently far behind the mounting support 5 to provide room for the transverse bore 36 and valving contained therein, and there is also the danger that if the fluid lines 48 and 49 between the master unit 4 and slave unit 70 should be cut or severed resulting in loss of fluid pressure in the lines, the slave piston 72 will be free to move by external applied forces, which could result in sharp turning and wild gyrations of the boat, endangering the safety of its occupants.

Accordingly, it is preferred that the check valves 56' and 57' and shuttle valve operating piston 55' be incorporated in the slave unit 70 as shown in FIG. 6 rather than in the master unit 4 to reduce space requirements behind the mounting support for the master unit 4 and provide for better control of the boat in the event of loss of fluid pressure. To this end, a bore 85 may be provided in the head end 76 of the slave cylinder 69 for receipt of the check valve bodies 34' and 35'. Preferably, the bore 85 extends longitudinally through the head end 76, communicating with the port 74 in the head end of the cylinder and closed at its outer end by an end plate 86 suitably attached to the cylinder. The check valve bodies 34' and 35' are retained in spaced apart relation within the bore 85 by snap rings 87 or the like, and one end of the check valve body 34' may abut against the end plate 86 as shown in FIG. 6.

The external ports 88 and 89 for the slave unit 70 to which the fluid lines 48 and 49 are connected communicate with the bore 85 between the check valve bodies 34' and 35' and adjacent ends of the shuttle valve operating piston 55' disposed therebetween. Of course, with the valving in the slave unit 70, the transverse passage 36 in the porting plate 7' may be eliminated and the fluid lines 48 and 49 connected directly to the passages 50' and 51' which may extend to the outer face 90 of the porting plate as shown in FIGS. 7 and 8. This eliminates the need for any protrusion of the porting plate 7' behind the mounting support 5 to facilitate installation in even tighter areas as by attachment of a narrow channel member 91 to the porting plate 7' using suitable fasteners 92 extending through openings 93 in the channel member into tapped holes 94 in the porting plate. The channel member 91 is placed behind the dashboard panel 5 and is of a length greater than the diameter of the opening 31 in the dash panel which receives the porting plate, whereby tightening of the fasteners 92 draws the master unit 4' into tight engagement with the dash panel. However, the width of the channel member 90 is less than the spacing between the ports in the outer face of the porting plate 7' for the passages 50' and 51' so as not to interfere with the connections between the fluid lines 48 and 49 and associated passages on opposite sides of the channel member. Otherwise, the details of construction of the master unit 4' illustrated in FIGS. 7 and 8 is the same as the master unit 4 previously described except that a snap ring 95 is used in place of the tie rods 22 to secure the cylindrical housing 8' and porting plate 7' together.

More importantly, the disposition of the check valves 56' and 57' within the slave unit 70 provides the important safety feature of preventing freedom of movement of the slave piston 72 when there is a loss of fluid pressure between the master unit 4 and slave unit 70 due to line breakage or other reason. During normal operation, turning of the steering wheel 3 in one direction causes fluid pressure to be pumped through the fluid line 48 to the associated external port 88 in the slave unit 70, which opens the associated check valve 57' for flow of high fluid pressure through the port 74 in the left end of the chamber 69. At the same time, such high fluid pressure acting on the right end of the shuttle valve operating piston 55' causes the shuttle valve to move to the left unseating the other check valve operating piston 56' for return flow of hydraulic fluid from the right end of the chamber. Turning of the steering wheel in the reverse direction causes a reversal in the flow of fluid between the master unit 4 and slave unit 70 as previously described. Snap rings 96 contained within the bore 85 between the external ports 88 and 89 and shuttle valve operating piston 55' act as stops limiting the movement of the shuttle valve operating piston toward the respective check valves 56' and 57' to avoid blocking communication between the check valves and external ports by the shuttle valve operating piston during opening of the check valves by the projections 58' on the shuttle valve operating piston.

Should there ever be a complete loss of fluid pressure within the fluid lines 48 and 49, the check valves 56' and 57' will remain closed by the associated springs 97 and 98 locking the slave piston 72 against movement even when a high external force is applied to the piston rod. This eliminates any chance of unexpected or wild movements of the steering mechanism for the boat which could endanger the safety or lives of the occupants; the steering mechanism is retained in the same position until fluid pressure is restored to the system and the operator turns the steering wheel in the desired direction.

To assure rapid assembly and bleeding of the hydraulic steering system, a pair of bleed ports 99 may be provided in the slave cylinder 69 communicating with the bore 85 between the check valve bodies 34' and 35' and adjacent ends of the shuttle valve operating piston 55'. Contained within the ports 99 are needle valves 100 which may readily be backed off to bleed the hydraulic system and tightened upon completion of the bleeding operation.

From the foregoing, it will now be apparent that the steering system of the present invention may be readily mounted on a dashboard or other mounting support even when there is very little space behind the dashboard, since the entire hydraulic pump mechanism is contained within a housing on the front side of the dashboard which provides a mount for the steering wheel shaft. Only a small portion of the porting plate protrudes behind the dashboard, just sufficient to provide room for the fittings which connect the steering system to fluid pressure lines leading to the slave unit actuated thereby. In actual practice, it has been found that the porting plate need only extend between 1 and 2 inches behind the normal dashboard. Slight additional clearance will also be needed behind the dashboard for securing the steering system to the dashboard, but the pumping mechanism may be serviced from the front simply by removing the housing for the steering wheel shaft. The valving for controlling fluid flow between the pump mechanism and slave unit may also be disposed within the slave unit rather than in the master unit to reduce space requirements for mounting of the master unit and provide the additional safety feature of preventing uncontrolled movement of the slave piston in the event of loss of fluid pressure in the system.

I, therefore, particularly point out and distinctly claim as my invention:

1. A hydraulic control system comprising a master unit, a slave unit, and a pair of fluid lines interconnecting said master and slave units, said master unit including pump means for selectively supplying fluid under pressure to one of said lines and venting the other of said lines, and said slave unit comprising a cylinder containing a chamber, a piston axially movable within said chamber, passages in said cylinder providing communication between said fluid lines and the ends of said chamber, check valves in said cylinder associated with said passages responsive to fluid pressure in said fluid lines to permit fluid flow from said pump means to said chamber through said passages, and means in said cylinder responsive to the fluid pressure in one of said passages to open the check valve associated with the other passage for return flow of fluid from said chamber to said pump means, said last-mentioned means comprising a shuttle valve operating piston having sliding sealed engagement in a bore in said cylinder, said check valves being contained in said bore in spaced relation from the ends of said shuttle valve operating piston, said passages being interrupted by said bore requiring flow through said check valves, said shuttle valve operating piston having stem portions projecting from the ends thereof for opening of said check valves when urged thereagainst by high fluid pressure acting on the opposite end of said shuttle valve operating piston, said bore containing said check valves and shuttle valve operating piston therebetween extending longitudinally through the head end of said cylinder providing direct communication with the head end of said cylinder, and an end plate attached to the head end of said cylinder covering the outer end of said bore.

2. The hydraulic system of claim 1 further comprising snap rings in said bore for limiting the movement of said shuttle valve operating piston toward said check valves to avoid blocking communication between said check valves and passages by said shuttle valve operating piston.

3. The hydraulic system of claim 1 further comprising a pair of bleed ports in said cylinder communicating with said bore intermediate said check valves and the adjacent ends of said shuttle valve operating piston, and needle valves contained within said bleed ports permitting controlled bleeding of said system.

4. The hydraulic system of claim 1 further comprising a mounting shaft having a ball joint on one end, said head end of said cylinder having a socket for receipt of said ball joint to permit pivotal movement of said cylinder relative to said mounting shaft.

5. The hydraulic system of claim 1 wherein said master unit comprises a housing, a drive shaft extending into one end of said housing and journaled therein for rotation, said pump means being wholly contained within said housing, means connecting said pump means to said drive shaft for actuation thereby, and a porting plate for said pump means secured to the other end of said housing, said porting plate containing passages for connection to said fluid lines.

6. The hydraulic system of claim 5 wherein said porting plate has an outer diameter less than the outer diameter of said housing for receipt in an opening in a mounting support with the other end of said housing engaging the front side of said mounting support, and means for securing said housing and porting plate to said mounting support with said other end of said housing engaging the front side of said mounting support and said porting plate extending into the opening in said mounting support as aforesaid.

7. The hydraulic system of claim 6 wherein said means for securing said housing and porting plate to said mounting support comprises a channel member disposed behind said mounting support and having a length greater than the opening in said mounting support for said porting plate, and fastener means extending through said channel member into tapped openings in said porting plate.

8. The hydraulic system of claim 7 wherein said channel member is of a width less than the spacing between said passages in said porting plate and is disposed therebetween with said fluid lines connected to said passages on opposite sides of said channel member.

9. A hydraulic control system comprising a master unit, a slave unit, and a pair of fluid lines interconnecting said master and slave units, said master unit comprising a housing, a drive shaft extending into one end of said housing and journaled therein for rotation, pump means wholly contained within said housing for selectively supplying fluid under pressure to one of said lines and venting the other of said lines, means connecting said pump means to said drive shaft for actuation thereby, and a porting plate for said pump means secured to the other end of said housing, said porting plate containing passages for connection to said fluid lines, said porting plate having an outer diameter less than the outer diameter of said housing for receipt in an opening in a mounting support with the other end of said housing engaging the front side of said mounting support, and means for securing said housing and porting plate to said mounting support with said other end of said housing engaging the front side of said mounting support and said porting plate extending into the opening in said mounting support as aforesaid, said means for securing said housing and porting plate to said mounting support comprising a channel member disposed between said mounting support and having a length greater than the opening in said mounting support for said porting plate, and fastener means extending through said channel member into tapped openings in said porting plate, said channel member being of a width less than the spacing between said passages in said porting plate and disposed therebetween with said fluid lines connected to said passages on opposite sides of said channel member.

* * * * *